(12) United States Patent
Koujiya et al.

(10) Patent No.: US 11,088,404 B2
(45) Date of Patent: Aug. 10, 2021

(54) CONTACT FAILURE DETECTION SYSTEM

(71) Applicant: Panasonic Intellectual Property Management Co., Ltd., Osaka (JP)

(72) Inventors: Takuya Koujiya, Hyogo (JP); Tadao Kimura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 16/472,891

(22) PCT Filed: Jan. 17, 2018

(86) PCT No.: PCT/JP2018/001103
§ 371 (c)(1),
(2) Date: Jun. 23, 2019

(87) PCT Pub. No.: WO2018/135507
PCT Pub. Date: Jul. 26, 2018

(65) Prior Publication Data
US 2019/0319317 A1 Oct. 17, 2019

(30) Foreign Application Priority Data

Jan. 23, 2017 (JP) .............................. JP2017-009604

(51) Int. Cl.
*G01K 15/00* (2006.01)
*G01K 3/00* (2006.01)
(Continued)

(52) U.S. Cl.
CPC ....... *H01M 10/486* (2013.01); *H01M 10/425* (2013.01); *H01R 13/6683* (2013.01);
(Continued)

(58) Field of Classification Search
USPC .................................. 374/11, 102, 112, 141
See application file for complete search history.

(56) References Cited

U.S. PATENT DOCUMENTS

2012/0294332 A1* 11/2012 Monks ..................... G01K 3/14
374/152
2013/0108904 A1 5/2013 Okabayashi
2016/0107530 A1* 4/2016 Roberts .............. H01R 13/6683
320/109

FOREIGN PATENT DOCUMENTS

JP 61-228340 10/1986
JP 2002-134964 5/2002
(Continued)

OTHER PUBLICATIONS

International Search Report of PCT application No. PCT/JP2018/001103 dated Feb. 13, 2018.

*Primary Examiner* — Mirellys Jagan
(74) *Attorney, Agent, or Firm* — McDermott Will and Emery LLP

(57) ABSTRACT

A temperature sensor detects a temperature at a contact between a live part of connector for a first circuit device and a live part of a connector for a second circuit device. A controller determines the occurrence of a contact failure between the live parts if a difference between an amount of change in temperature detected by the temperature sensor per predetermined time and an amount of change in ambient temperature per predetermined time is greater than a set value.

9 Claims, 8 Drawing Sheets

(51) Int. Cl.
  *G01K 13/00* (2021.01)
  *H01M 10/48* (2006.01)
  *H01M 10/42* (2006.01)
  *H01R 13/66* (2006.01)
  *H01R 43/00* (2006.01)
  *H02J 7/04* (2006.01)

(52) U.S. Cl.
  CPC ............... *H01R 43/00* (2013.01); *H02J 7/04* (2013.01); *H01M 2010/4271* (2013.01)

(56) References Cited

FOREIGN PATENT DOCUMENTS

| | | |
|---|---|---|
| JP | 2013-097901 | 5/2013 |
| JP | 2013-206656 | 10/2013 |

* cited by examiner

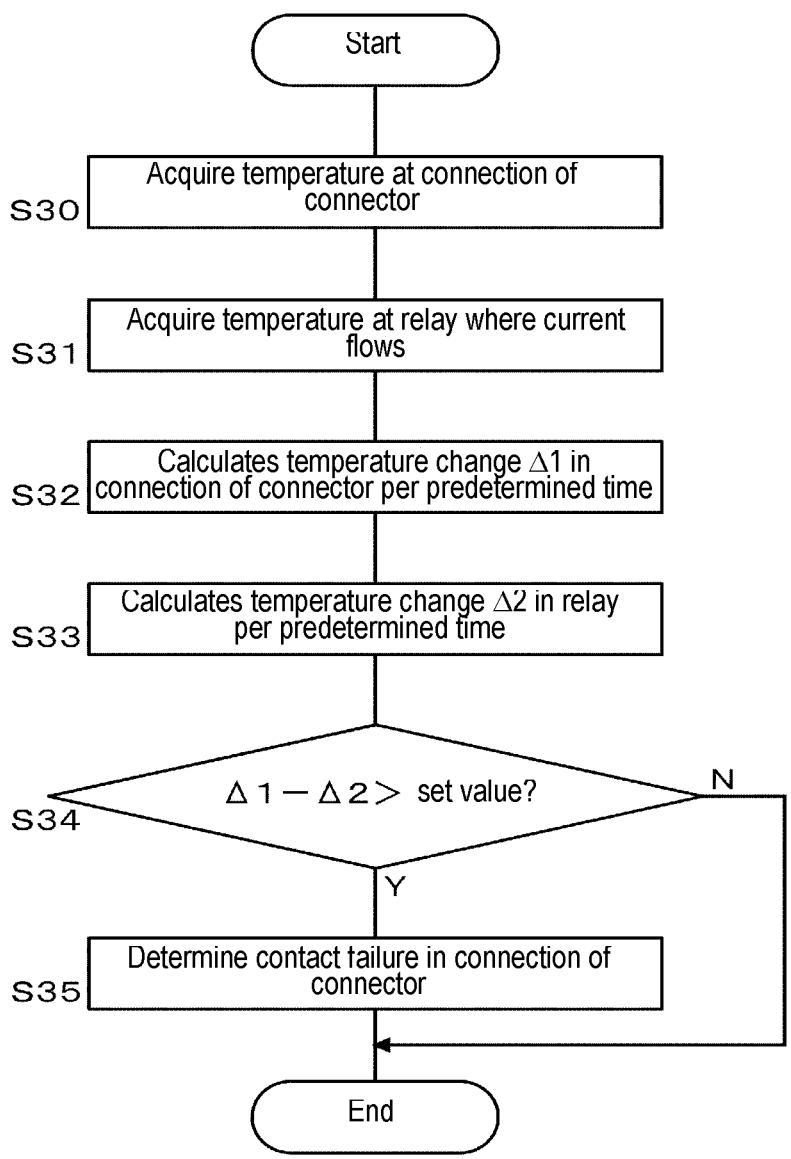

CONTACT FAILURE DETECTION SYSTEM

This application is a U.S. national stage application of the PCT International Application No. PCT/JP2018/001103 filed on Jan. 17, 2018, which claims the benefit of foreign priority of Japanese patent application No. 2017-009604 filed on Jan. 23, 2017, the contents all of which are incorporated herein by reference.

TECHNICAL FIELD

The present invention relates to a contact failure detection system that detects a contact failure in a connection of a connector.

BACKGROUND ART

Large power storage systems are mostly rack type system configurations. In general, a rack type power storage system has a rack in which a plurality of battery modules are inserted, and the plurality of the battery modules is electrically connected to one another by bus bars located at a rear face of the rack. This configuration does not basically enable a visual check of contact points between electrode terminals of the battery packs and connectors at the rear face of the rack.

In response to the occurrence of a contact failure caused by a foreign substance mixed into a connection of the connector, resistance of a contact of the terminal increases. Resistance of the contact also increases due to aging degradation of the connector. If a large current flows into a terminal with a contact of increased resistance, the contact of the terminal generates an increased amount of heat, resulting in a rise in the risk of smoking or fire.

A method for detecting a contact failure in a connection of a connector without a visual check involves monitoring a temperature of a connector and determining that a contact failure occurs if the temperature of the connector exceeds a threshold (for example, refer to PTL 1).

CITATION LIST

Patent Literature

PTL 1: Unexamined Japanese Patent Publication No. 2002-134964

SUMMARY OF THE INVENTION

The method for contact failure detection described above is affected by temperatures in an ambient environment. For example, if a power storage system is installed in a high-temperature room, it is difficult to distinguish whether a rise in temperature at a connection of a connector is attributed to an increase in contact resistance or the ambient environment.

The present invention has been accomplished in view of the above circumstances, and an object thereof is to provide a technique for detecting a contact failure in a connector without being affected by an environment where a system is installed.

A contact failure detection system according to an aspect of the present invention, accomplished to solve the problem described above, includes a temperature sensor to detect a temperature at a contact between a live part of a connector for a first circuit device and a live part of a connector for a second circuit device, and a controller to determine occurrence of a contact failure between the live parts if a difference between an amount of change in temperature detected by the temperature sensor per predetermined time and an amount of change in ambient temperature per predetermined time is greater than a set value.

Any desired combinations of the above-described configuration elements and converted expressions of the present invention in methods, devices, systems, and other similar entities are still effective as aspects of the present invention.

A system according to the present invention enables detection of a contact failure in a connector in a standardized way without being affected by an environment where the system is installed.

BRIEF DESCRIPTION OF DRAWINGS

FIG. 8 is a flowchart showing an example procedure used in a method for detecting a contact failure according to the second exemplary embodiment of the present invention.

DESCRIPTION OF EMBODIMENTS

Figure 1:
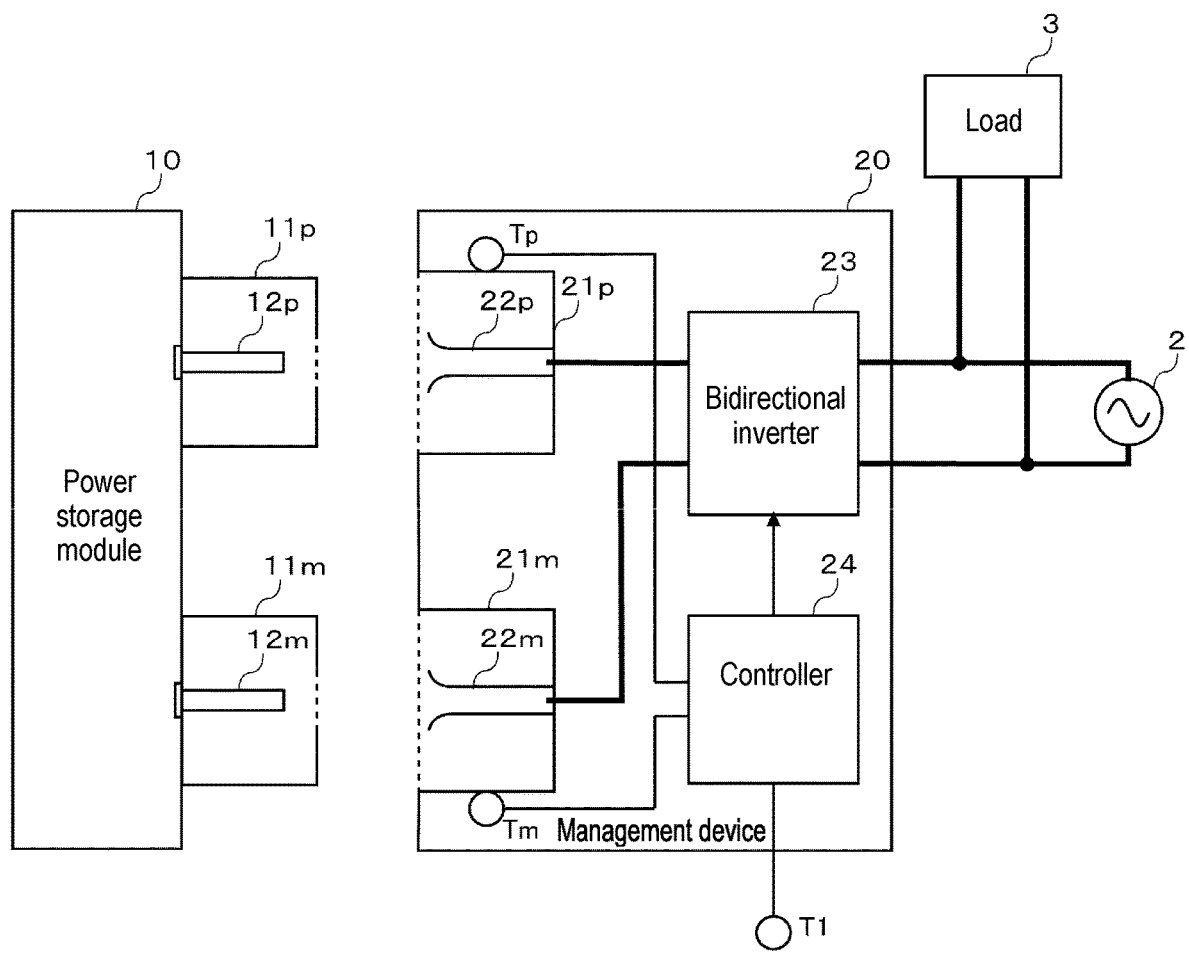
FIG. 1 is a drawing illustrating a power storage system according to a first exemplary embodiment of the present invention.

FIG. 1 is a drawing illustrating power storage system 1 according to a first exemplary embodiment of the present invention. Power storage system 1 includes power storage module 10 and management device 20. Power storage module 10 includes a plurality of cells connected in series, parallel, or series and parallel. Examples of the cells include lithium ion battery cells, nickel hydride battery cells, lead battery cells, electric double layer capacitor cells, and lithium ion capacitor cells.

Management device 20 is a device used to manage power storage module 10 and includes bidirectional inverter 23 and controller 24. Bidirectional inverter 23 is connected between power storage module 10 and a commercial power system (hereinafter referred to simply as power system 2). Load 3 is connected to a distribution line connecting bidirectional inverter 23 with power system 2. Bidirectional inverter 23 is used to convert AC power supplied from power system 2 into DC power and charge power storage module 10. The bidirectional inverter is also used to convert DC power discharged from power storage module 10 into AC power and output the converted power to the distribution line described above.

Controller 24 controls bidirectional inverter 23 to put electricity into or discharge electricity from power storage module 10 at constant current (CC)/constant voltage (CV). If a bidirectional DC/DC converter (not shown) is disposed between power storage module 10 and bidirectional inverter 23, controller 24 is able to put electricity into or discharge electricity from power storage module 10 at constant current (CC)/constant voltage (CV) by controlling the bidirectional DC/DC converter.

When power storage module 10 is connected to management device 20, positive-electrode connector 11p for power storage module 10 is fitted into positive-electrode connector 21p for management device 20, and negative-electrode connector 11m for power storage module 10 is fitted into negative-electrode connector 21m for management device 20. Positive-electrode connector 11p for power storage module 10 includes positive-electrode male terminal 12p in a resin housing. Similarly, negative-electrode connector 11m for power storage module 10 includes negative-electrode male terminal 12m in a resin housing.

Positive-electrode connector 21p for management device 20 includes positive-electrode female terminal 22p in a resin housing that has an internal space. The resin housing of positive-electrode connector 11p for power storage module 10 is installed in the internal space. Similarly, negative-electrode connector 21m for management device 20 includes negative-electrode female terminal 22m in a resin housing that has an internal space. The resin housing of negative-electrode connector 11m for power storage module 10 is installed in the internal space.

Shapes of positive- and negative-electrode connectors 11p and 11m for power storage module 10 as well as shapes of positive- and negative-electrode connectors 21p and 21m for management device 20 shown in FIG. 1 are examples. These connectors may have any shapes other than the shapes shown in FIG. 1, with proviso that the shapes of the connectors ensure physical contact between electrodes on power storage module 10 and electrodes on management device 20. The electrodes of power storage module 10 may be tab terminals, and the electrodes of management device 20 may be terminals that are shaped so as to clamp the respective tab terminals, for example.

FIG. 1 shows positive- and negative-electrode connectors 11p and 11m that are directly mounted on a housing of power storage module 10, for example. However, positive- and negative-electrode connectors 11p and 11m may be connected with a body of power storage module 10 via respective cables. Similarly, management device 20 may have such a configuration.

In this exemplary embodiment, management device 20 has positive-electrode temperature sensor Tp that is disposed on an external surface of the resin housing of positive-electrode connector 21p. Similarly, management device 20 has negative-electrode temperature sensor Tm that is disposed on an external surface of the resin housing of negative-electrode connector 21m. Positive- and negative-electrode temperature sensors Tp and Tm may be formed of thermistors or thermocouples, for example. Preferably, positive- and negative-electrode temperature sensors Tp and Tm are each covered with a resin. Positive- and negative-electrode temperature sensors Tp and Tm output respective detected temperatures to controller 24.

Controller 24 acquires a temperature detected at a connection of the positive-electrode connector from positive-electrode temperature sensor Tp and a temperature detected at a connection of the negative-electrode connector from negative-electrode temperature sensor Tm. Controller 24 also acquires a temperature detected by ambient temperature sensor T1. Ambient temperature sensor T1 may be disposed outside or inside a housing of management device 20. If the ambient temperature sensor is disposed inside the housing, the ambient temperature sensor needs to be disposed at a location that is less affected by heat generated from a circuit area (a location where temperature change is smaller) than locations of temperature acquisition parts of positive- and negative electrode temperature sensors Tp and Tm.

While an electric current is flowing between power storage module 10 and bidirectional inverter 23, controller 24 compares an amount of change in temperature acquired from positive-electrode temperature sensor Tp per predetermined time (e.g. several minutes) with an amount of change in temperature acquired from ambient temperature sensor T1 per predetermined time. The controller determines that a contact failure has occurred between positive-electrode connector 11p for power storage module 10 and positive-electrode connector 21p for management device 20 if a difference between the change amounts is greater than a set value, and determines that a contact is satisfactory if the difference is less than or equal to the set value.

Similarly, while an electric current is flowing between power storage module 10 and bidirectional inverter 23, controller 24 compares an amount of change in temperature acquired from negative-electrode temperature sensor Tm per predetermined time with an amount of change in temperature acquired from ambient temperature sensor T1 per predetermined time. The controller determines that a contact failure has occurred between negative-electrode connector 11m for power storage module 10 and negative-electrode connector 21m for management device 20 if a difference between the change amounts is greater than a set value, and determines that a contact is satisfactory if the difference is less than or equal to the set value.

When the occurrence of a contact failure is determined, controller 24 turns off a shutdown switch (not shown) inserted in a current path connecting power storage module 10 with bidirectional inverter 23 to electrically shut off current flow between the two components. Controller 24 also sends notice of the occurrence of a contact failure to a user interface (not shown). The controller sounds an alarm, displays an alert on a monitor, or changes lamp color from green to red, for example.

Through a communication line (not shown) connecting power storage module 10 with management device 20, controller 24 acquires voltages, currents, and temperatures of the plurality of the cells in power storage module 10 from a monitoring circuit inside power storage module 10. In the event of an abnormality, such as overvoltage, undervoltage, overcurrent, or temperature abnormality, in any of the cells in power storage module 10, controller 24 turns off the shutdown switch described above to electrically shut off current flow between power storage module 10 and bidirectional inverter 23. Controller 24 also controls or manages state-of-charge (SOC) and state-of-health (SOH) of the plurality of the cells in power storage module 10, as well as performs equalization control, for example.

For the sake of simplifying description, FIG. 1 shows an example system in which one power storage module 10 is connected with management device 20. However, mostly, power storage system 1 in actual use includes a plurality of power storage modules 10 connected in series, parallel, or series and parallel.

Figure 2A:
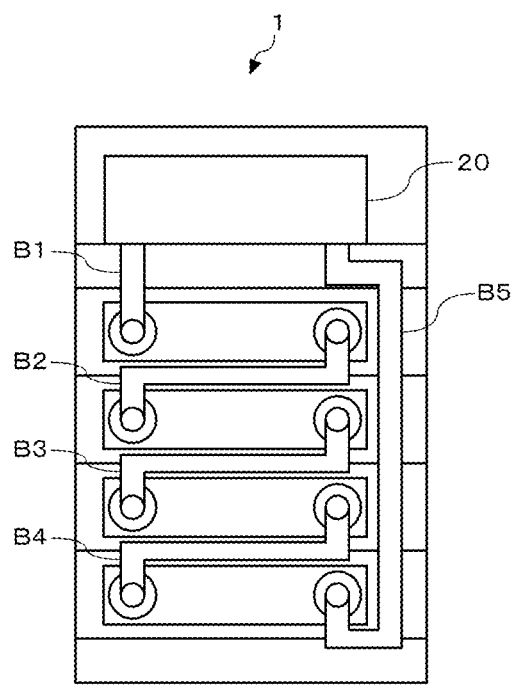
FIGS. 2A and 2B are drawings illustrating a rack type power storage system according to the first exemplary embodiment of the present invention.
Figure 2B:
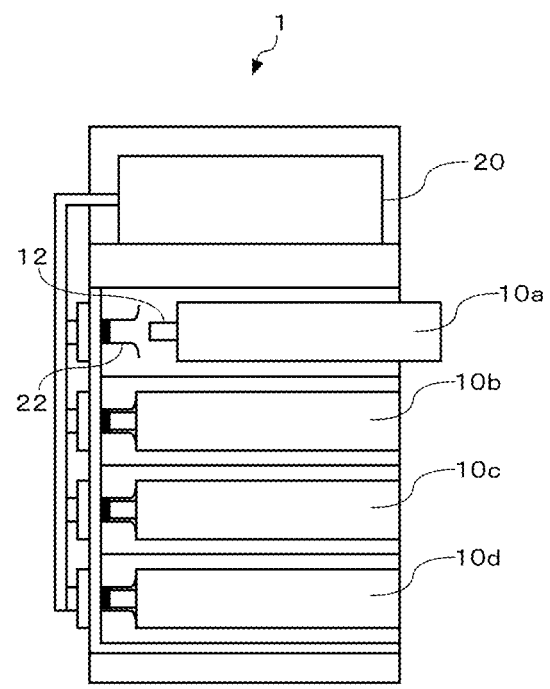

FIGS. 2A and 2B are drawings illustrating rack type power storage system 1 according to the first exemplary embodiment of the present invention. Rack type power storage system 1 includes a plurality of packs of power storage modules 10 stacked in a rack. FIG. 2A is a back elevation of power storage system 1, viewed from rear of the rack. FIG. 2B is a cross-sectional view, viewed from a side of the rack.

As shown in FIG. 2B, the rack has a plurality of compartments in a vertical direction, with one power storage module 10 inserted into each of the compartments. FIG. 2B shows an example of the rack capable of housing four power storage modules 10a to 10d. Management device 20 is disposed on a highest shelf of the rack. Management device 20 may be disposed on a lowest shelf of the rack.

Positive- and negative-electrode male terminals 12p and 12m extending from a head of power storage module 10 in an insertion direction are installed into positive- and negative-electrode female terminals 22p and 22m, respectively, disposed deep in the compartment of the rack. Terminals opposed to positive- and negative-electrode female terminals 22p and 22m extend outward from the rear of the rack, and are connected via bus bars to a terminal opposed to negative-electrode female terminal 22m of adjacent power storage module 10 and a terminal opposed to positive-electrode female terminal 22p of another adjacent power storage module 10, respectively.

In an example shown in FIG. 2A, a terminal opposed to (outside the rack) positive-electrode female terminal 22p connected to positive-electrode male terminal 12p of first power storage module 10a is connected to positive-electrode terminal 22p of management device 20 by first bus bar B1. A terminal opposed to negative-electrode female terminal 22m connected to negative-electrode male terminal 12m of first power storage module 10a is connected to a terminal opposed to positive-electrode female terminal 22p connected to positive-electrode male terminal 12p of second power storage module 10b by second bus bar B2. Similarly, a terminal opposed to negative-electrode female terminal 22m connected to negative-electrode male terminal 12m of second power storage module 10b is connected to a terminal opposed to positive-electrode female terminal 22p connected to positive-electrode male terminal 12p of third power storage module 10c by third bus bar B3. Similarly, a terminal opposed to negative-electrode female terminal 22m connected to negative-electrode male terminal 12m of third power storage module 10c is connected to a terminal opposed to positive-electrode female terminal 22p connected to positive-electrode male terminal 12p of fourth power storage module 10d by fourth bus bar B4. A terminal opposed to negative-electrode female terminal 22m connected to negative-electrode male terminal 12m of fourth power storage module 10d is connected to negative-electrode terminal 22m of management device 20 by fifth bus bar B5.

In power storage system 1 thus shown in FIGS. 2A and 2B, four power storage modules 10a to 10d are connected in series, thereby providing an increased voltage. If all the positive-electrode terminals of four power storage modules 10a to 10d are connected by a bus bar and all the negative-electrode terminals are connected by another bus bar, four power storage modules 10a to 10d are connected in parallel, thus providing an increased capacity.

Positive- and negative-electrode temperature sensors Tp and Tm are disposed in each compartment in the rack, despite no such illustration in FIGS. 2A and 2B. Ambient temperature sensor T1 is disposed outside the rack.

Figure 3:
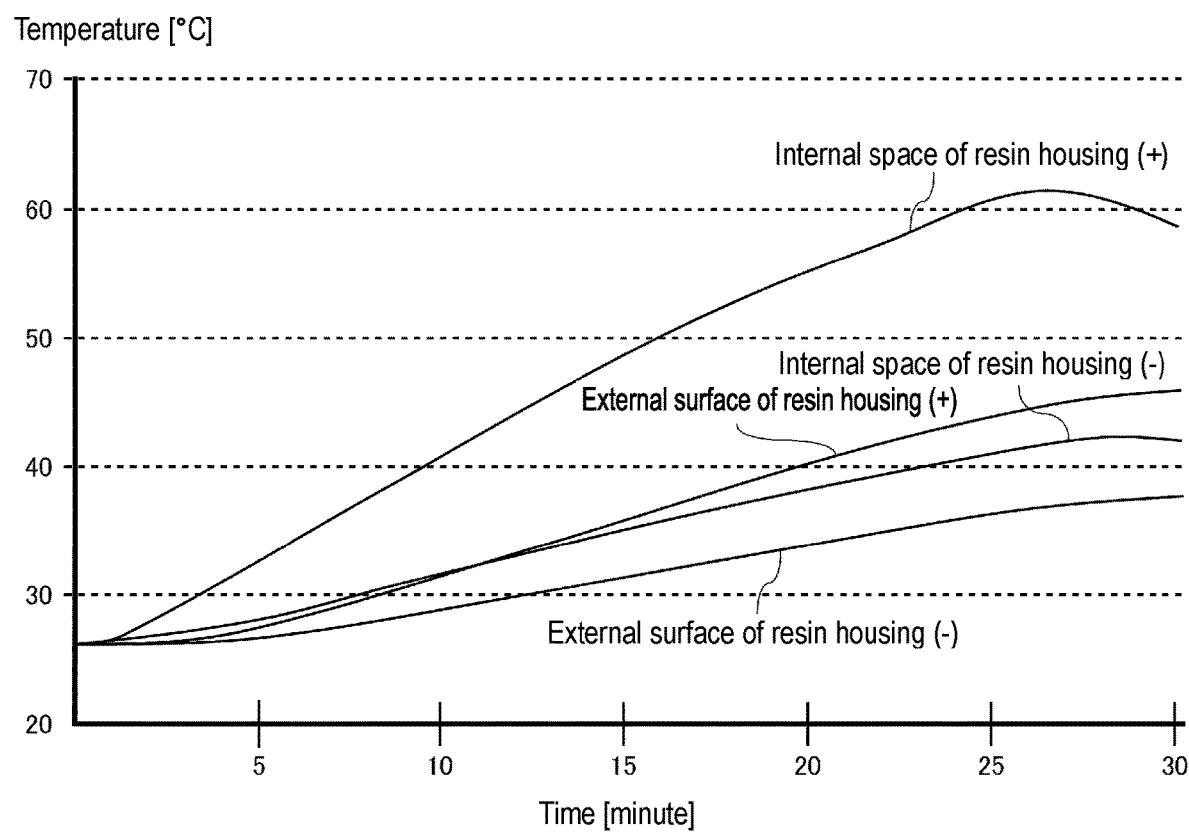
FIG. 3 is a graph showing results of simulation experiments where a foreign substance is mixed into a connector.

FIG. 3 is a graph showing results of simulation experiments where a foreign substance is mixed into a connector. A live part of the connector was covered with Kapton (registered trademark) tape to provide increased resistance and artificially create a state of contact failure. Since Kapton (registered trademark) tape was put on the live part, a resistance value of the live part increased from 0.10 mΩ to 0.60 mΩ. The graph in FIG. 3 shows changes in temperature while a constant current of 150 A flowed into the live part of the connector for 30 minutes.

The graph in FIG. 3 shows results of measurement in four cases in which, as shown in FIG. 1, positive-electrode temperature sensor Tp was disposed on the external surface of the resin housing of positive-electrode connector 21p and negative-electrode temperature sensor Tm was disposed on the external surface of the resin housing of negative-electrode connector 21m, as well as positive-electrode temperature sensor Tp was disposed in the internal space of the resin housing of positive-electrode connector 21p (not shown) and negative-electrode temperature sensor Tm was disposed in the internal space of the resin housing of negative-electrode connector 21m (not shown).

As shown in FIG. 3, the temperature in the case of the disposition of temperature sensor Tp in the internal space of the resin housing of positive-electrode connector 21p indicates a fastest rise following the start of a flow of electric current. In the case, the temperature rose by 1° C. or higher after a lapse of 2 minutes.

Figure 4:
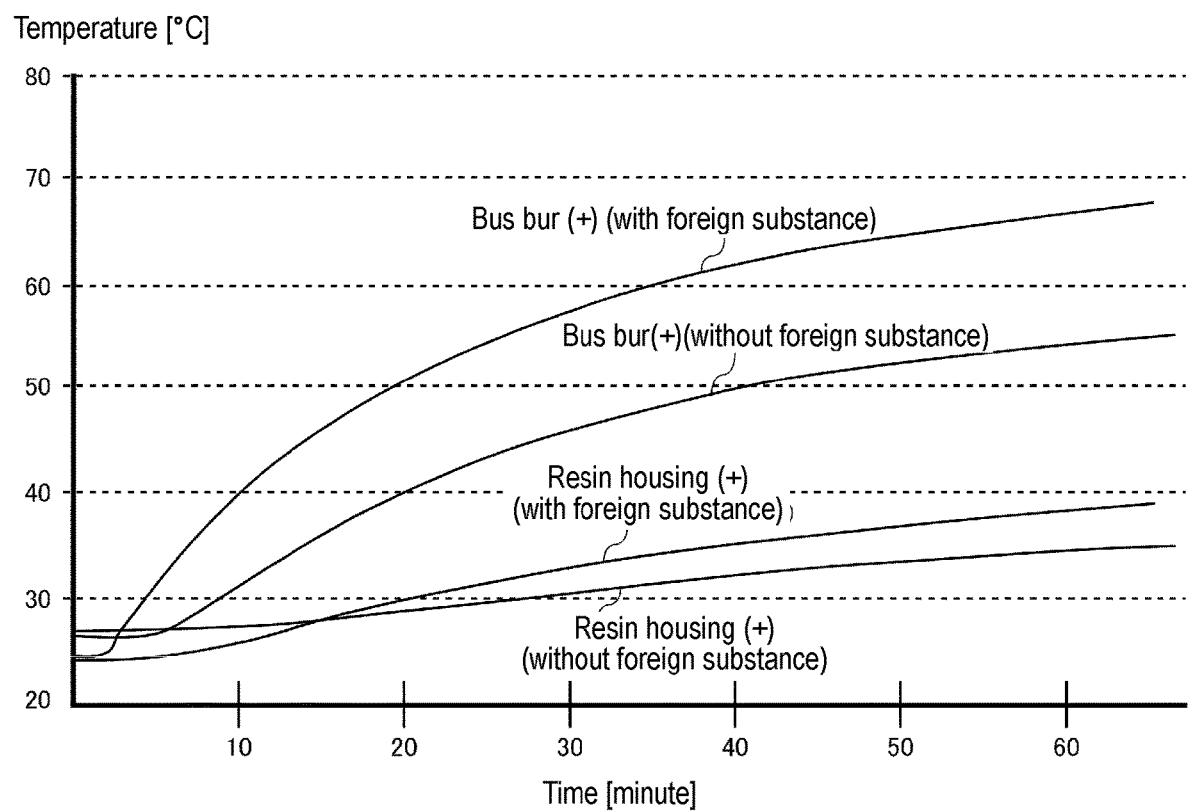
FIG. 4 is a graph showing results of simulation experiments conducted to compare a case in which a foreign substance is mixed into a connector and a case of normal use.

FIG. 4 is a graph showing results of simulation experiments conducted to compare a case in which a foreign substance is mixed into a connector and a case of normal use. In a similar way to the example of FIG. 3, to artificially create a state in which a foreign substance is mixed into a connector, a live part of the connector was covered with Kapton (registered trademark) tape. Since Kapton (registered trademark) tape was put on the live part, a resistance value of the live part increased from 0.10 mΩ to 0.60 mΩ. The graph in FIG. 4 shows changes in temperature while a constant current of 100 A flowed into the live part of the connector for 60 minutes.

The graph in FIG. 4 shows results of measurement in four cases in which positive-electrode temperature sensor Tp was disposed near the resin housing put over positive-electrode female terminal 22p in positive-electrode connector 21p for management device 20 (with foreign substance), positive-electrode temperature sensor Tp was disposed near the resin housing put over positive-electrode female terminal 22p in positive-electrode connector 21p for management device 20 (without foreign substance), positive-electrode temperature sensor Tp was disposed near a bus bur connected to positive-electrode female terminal 22p in positive-electrode connector 21p for management device 20 (with foreign substance), and positive-electrode temperature sensor Tp was disposed near a bus bur connected to positive-electrode female terminal 22p in positive-electrode connector 21p for management device 20 (without foreign substance).

The results in FIG. 4 indicate a difference in the rate of temperature rise between the cases with a foreign substance and the cases without a foreign substance. In particular, the temperature near the bus bar differs substantially between the case with a foreign substance and the case without a foreign substance. A similar tendency, despite a decreased absolute level, is displayed for the negative-electrode side.

Figure 5:
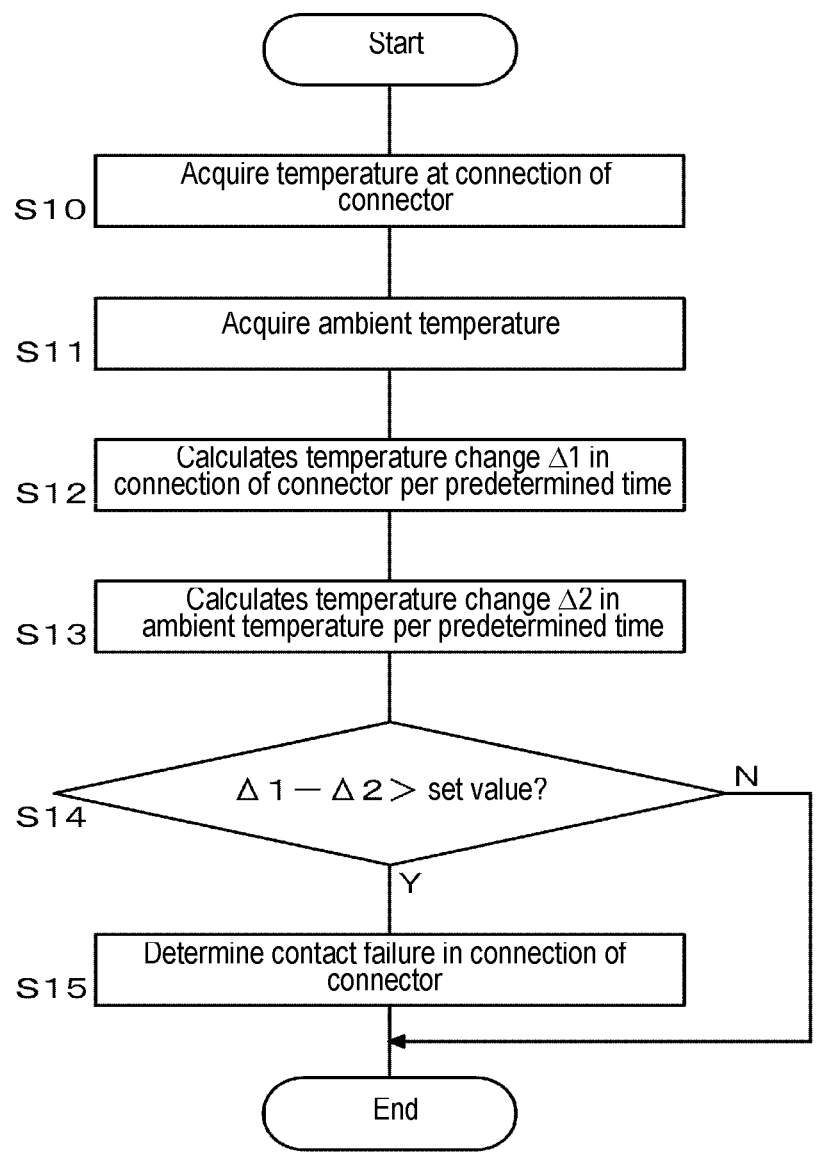
FIG. 5 is a flowchart showing a first example procedure used in a method for detecting a contact failure according to the first exemplary embodiment of the present invention.

FIG. 5 is a flowchart showing a first example procedure used in a method for detecting a contact failure according to the first exemplary embodiment of the present invention. Controller 24 of management device 20 acquires temperatures from positive- and negative-electrode temperature sensors Tp and Tm (S10). Controller 24 acquires an ambient temperature from ambient temperature sensor T1 (S11). Controller 24 calculates amount of change Δ1 in temperature acquired from positive-electrode temperature sensor Tp per predetermined time and calculates amount of change Δ1 in temperature acquired from negative-electrode temperature sensor Tm per predetermined time (S12). Controller 24 calculates amount of change Δ2 in temperature acquired from ambient temperature sensor T1 per predetermined time (S13).

Controller 24 subtracts amount of change Δ2 for ambient temperature sensor T1 from amount of change Δ1 for positive-electrode temperature sensor Tp to get a difference value and compares the difference value with a set value (S14). If the difference value is greater than the set value (Y in S14), the controller determines the occurrence of a contact failure in a connection of the live part of the positive-electrode connector (S15). If the difference value is less than or equal to the set value (N in S14), the controller determines that a contact is satisfactory.

Similarly, controller 24 subtracts amount of change Δ2 for ambient temperature sensor T1 from amount of change Δ1 for negative-electrode temperature sensor Tm to get a difference value and compares the difference value with a set value (S14). If the difference value is greater than the set value (Y in S14), the controller determines the occurrence of a contact failure in the negative-electrode connector (S15). If the difference value is less than or equal to the set value (N in S14), the controller determines that a contact is satisfactory.

The controller may execute a process from steps S12 to S15 while an electric current is flowing between power storage module 10 and bidirectional inverter 23 and may suspend the process while no electric current is flowing between the two components. This procedure contributes to a reduction in power consumption by controller 24.

The predetermined time and the set values described above depend on the dispositions of positive- and negative-electrode temperature sensors Tp and Tm, as well as an estimated value of the electric current flowing through the live part of each connector. As shown in FIG. 3, a case in which the temperature sensor is disposed inside the resin housing requires the predetermined time and the set value smaller than those required in a case in which the temperature sensor is disposed outside the resin housing. The designer should determine values for the predetermined time and the set value described above based on experiments or simulations.

Figure 6:
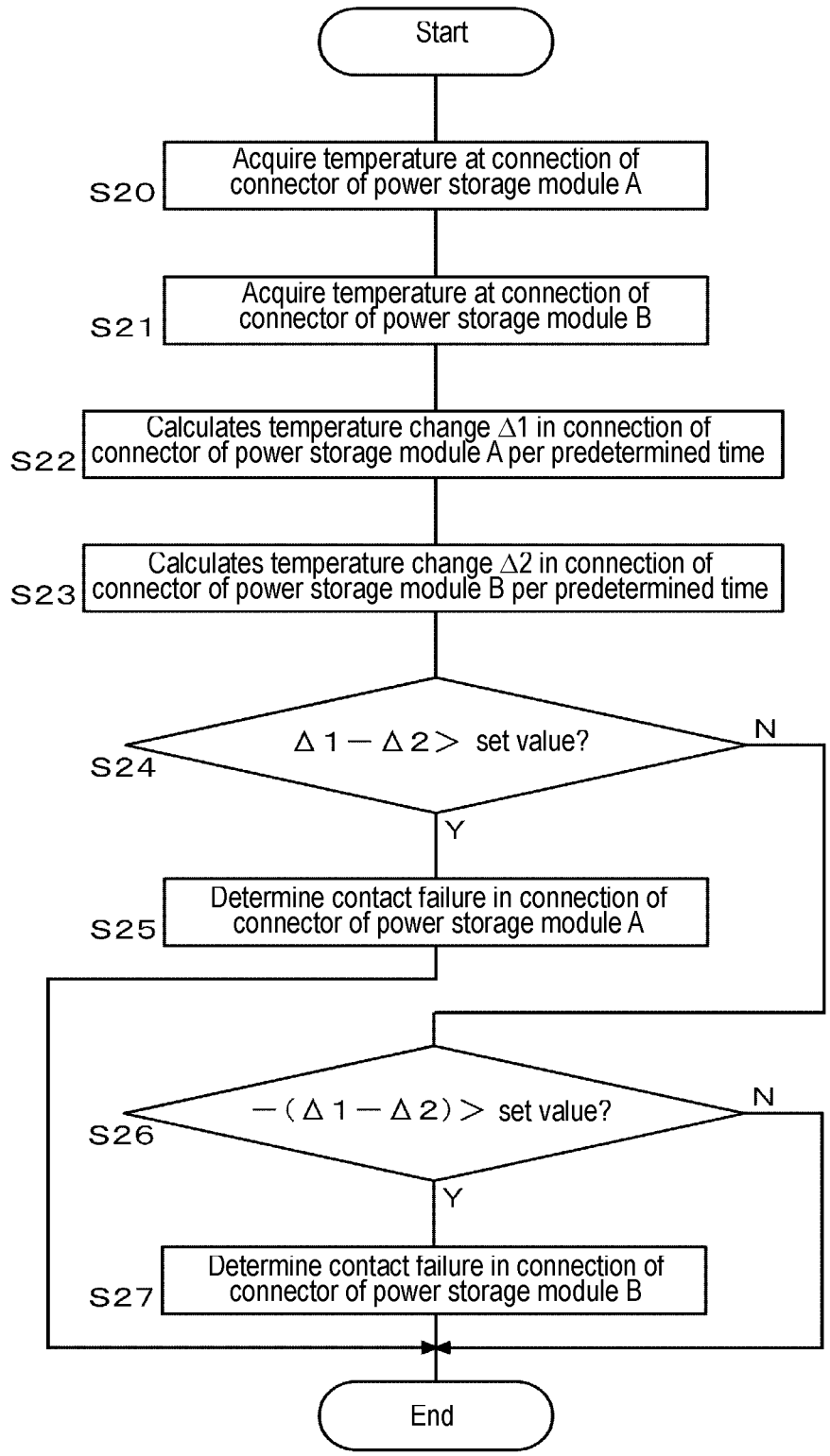
FIG. 6 is a flowchart showing a second example procedure used in a method for detecting a contact failure according to the first exemplary embodiment of the present invention.

FIG. 6 is a flowchart showing a second example procedure used in a method for detecting a contact failure according to the first exemplary embodiment of the present invention. Controller 24 of management device 20 acquires temperatures from positive- and negative-electrode temperature sensors Tp and Tm disposed at connections of connectors for one power storage module A (S20). Controller 24 acquires temperatures from positive- and negative-electrode temperature sensors Tp and Tm disposed at connections of connectors for another power storage module B connected in series with power storage module A (S21).

Controller 24 calculates amount of change Δ1 in temperature acquired from positive-electrode temperature sensor Tp, which is disposed at the connection of one of the connectors for power storage module A, per predetermined time, and calculates amount of change Δ1 in temperature acquired from negative-electrode temperature sensor Tm, which is disposed at the connection of the other connector for power storage module A, per predetermined time (S22).

Similarly, controller 24 calculates amount of change Δ2 in temperature acquired from positive-electrode temperature sensor Tp, which is disposed at the connection of one of the connectors for power storage module B, per predetermined time, and calculates amount of change Δ2 in temperature acquired from negative-electrode temperature sensor Tm, which is disposed at the connection of the other connector for power storage module B, per predetermined time (S23).

Controller 24 subtracts amount of change Δ2 for positive-electrode temperature sensor Tp disposed at the connection of the one connector for power storage module B from amount of change Δ1 for positive-electrode temperature sensor Tp disposed at the connection of the one connector for power storage module A to get a difference value and compares the difference value with a set value (S24). If the difference value is greater than the set value (Y in S24), the controller determines the occurrence of a contact failure in the connection of the positive-electrode connector for power storage module A (S25).

If the difference value is less than the set value (N in S24), controller 24 reverses a sign of the difference value from plus to minus or vice versa and compares the difference value of the opposite sign with the set value (S26). If the difference value of the opposite sign is greater than the set value (Y in S26), the controller determines the occurrence of a contact failure in the connection of the positive-electrode connector for power storage module B (S27). If the difference value of the opposite sign is less than or equal to the set value (N in S26), the controller determines that a contact is satisfactory in both the connection of the positive-electrode connector for power storage module A and the connection of the positive-electrode connector for power storage module B.

Similarly, controller 24 subtracts amount of change Δ2 for negative-electrode temperature sensor Tm disposed at the connection of the other connector for power storage module B from amount of change Δ1 for negative-electrode temperature sensor Tm disposed at the connection of the other connector for power storage module A to get a difference value and compares the difference value with a set value (S24). If the difference value is greater than the set value (Y in S24), the controller determines the occurrence of a contact failure in the connection of the negative-electrode connector for power storage module A (S25).

If the difference value is less than or equal to the set value (N in S24), controller 24 reverses a sign of the difference value from plus to minus or vice versa and compares the difference value of the opposite sign with the set value (S26). If the difference value of the opposite sign is greater than the set value (Y in S26), the controller determines the occurrence of a contact failure in the connection of the negative-electrode connector for power storage module B (S27). If the difference value of the opposite sign is less than or equal to the set value (N in S26), the controller determines that a contact is satisfactory in both the connection of the negative-electrode connector for power storage module A and the connection of the negative-electrode connector for power storage module B.

In the second example procedure, installation of ambient temperature sensor T1 is not essential. Preferably, power storage modules A and B are two power storage modules that are located as remote as possible from each other. For example, in the case of a configuration shown in FIG. 2, it is preferred that the procedure shown in FIG. 6 be conducted both between first and third power storage modules 10a and 10c and between second and fourth power storage modules 10b and 10d.

The method according to the first exemplary embodiment described above involves comparing temperatures detected by a plurality of temperature sensors disposed at a plurality of locations including connections of connectors. This enables removal of the impact of temperature changes caused by a change in the ambient environment and a change over time. Consequently, this method can detect an increase in contact resistance at a connection of a connector with high accuracy.

In contrast, the method of detecting a contact failure only by a temperature detected at a connection of a connector presents difficulty in sharply distinguishing whether a rise in temperature is attributed to an increase in contact resistance or an environmental factor. Maintaining detection accuracy in this method necessitates changing a temperature threshold in response to a change in the ambient environment. This, however, entails a complicated procedure. The method for detection according to the present exemplary embodiment, on the other hand, does not necessitate changing a threshold afterward.

The method of detecting a contact failure only by a temperature detected at a connection of a connector determines that a contact failure has occurred when the detected temperature reaches a temperature threshold. Under this method, it takes time before a failure is detected. The method for detection according to the present exemplary embodiment, on the other hand, determines that a contact failure has occurred when a difference between rates of increase of the temperatures at a plurality of locations reaches or exceeds a set value. This results in a reduction in the time taken before a failure is detected. This enables the method to recognize a contact failure at an earlier point in time and minimize damage inflicted on the system.

Figure 7:
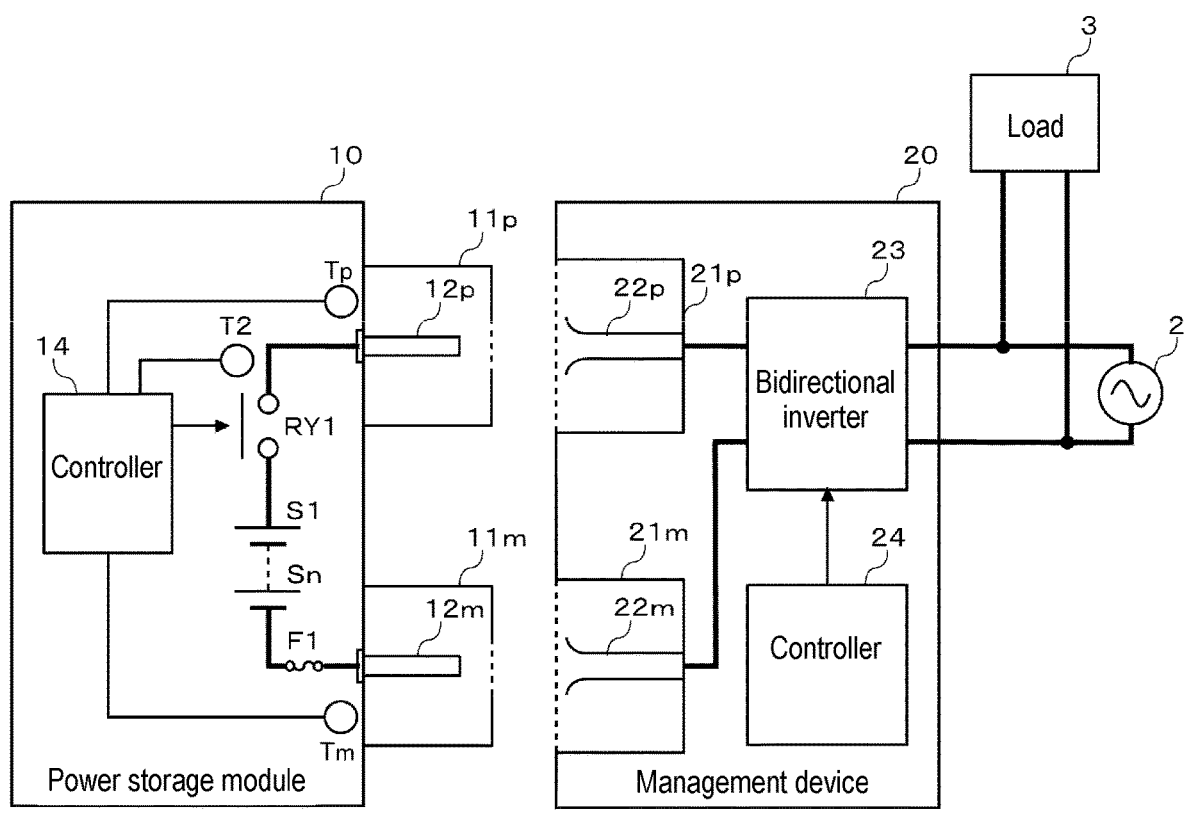
FIG. 7 is a drawing illustrating a power storage system according to a second exemplary embodiment of the present invention.

FIG. 7 is a drawing illustrating power storage system 1 according to a second exemplary embodiment of the present invention. In the second exemplary embodiment, a method for detecting a contact failure involves making a comparison between temperatures detected at "a contact of a connector terminal" and at "a live part (e.g. a bus bar and a relay) through which the same electric current as that flowing through the connector terminal flows". As shown in FIG. 7, power storage module 10 includes a plurality of cells S1 to Sn, relay RY1, and fuse F1 that are connected in series, and controller 14. Relay RY1 and fuse F1 are inserted in a current path shared with the plurality of cells S1 to Sn. A position at which each of these components is inserted may be a positive-electrode side or a negative-electrode side relative to the plurality of cells S1 to Sn, with proviso that the position is in the current path.

Controller 14 monitors states of the plurality of cells S1 to Sn and lets controller 24 of management device 20 know monitoring data via a communication line (not shown). In the event of an abnormality such as overvoltage, undervoltage, overcurrent, or an abnormal temperature in any of the plurality of cells S1 to Sn, controller 14 opens a contact of relay RY1 to protect the plurality of cells S1 to Sn.

In this exemplary embodiment, positive-electrode temperature sensor Tp is disposed near positive-electrode male terminal 12p in positive-electrode connector 11p for power storage module 10. Similarly, negative-electrode temperature sensor Tm is disposed near negative-electrode male terminal 12m in negative-electrode connector 21m for power storage module 10. In this exemplary embodiment, relay temperature sensor T2 is disposed near relay RY1. Positive-electrode temperature sensor Tp, negative-electrode temperature sensor Tm, and relay temperature sensor T2 output detected temperatures to controller 14.

Controller 14 acquires a temperature detected at a connection of the positive-electrode connector from positive-electrode temperature sensor Tp, a temperature detected at a connection of the negative-electrode connector from negative-electrode temperature sensor Tm, and a temperature detected at the relay from relay temperature sensor T2. While an electric current is flowing between power storage module 10 and bidirectional inverter 23, controller 14 compares an amount of change in temperature acquired from positive-electrode temperature sensor Tp per predetermined time with an amount of change in temperature acquired from relay temperature sensor T2 per predetermined time. The controller determines that a contact failure has occurred between positive-electrode connector 11p for power storage module 10 and positive-electrode connector 21p for management device 20 if a difference between the change amounts is greater than a set value, and determines that a contact is satisfactory if the difference is less than or equal to the set value.

Similarly, while an electric current is flowing between power storage module 10 and bidirectional inverter 23, controller 14 compares an amount of change in temperature acquired from negative-electrode temperature sensor Tm per predetermined time with an amount of change in temperature acquired from relay temperature sensor T2 per predetermined time. The controller determines that a contact failure has occurred between negative-electrode connector 11m for power storage module 10 and negative-electrode connector 21m for management device 20 if a difference between the change amounts is greater than a set value, and determines that a contact is satisfactory if the difference is less than or equal to the set value.

FIG. 8 is a flowchart showing an example procedure used in a method for detecting a contact failure according to the second exemplary embodiment of the present invention. Controller 14 of power storage module 10 acquires temperatures from positive- and negative-electrode temperature sensors Tp and Tm (S30). Controller 14 acquires a temperature detected at relay RY1 from relay temperature sensor T2 (S31). Controller 14 calculates amount of change $\Delta 1$ in temperature acquired from positive-electrode temperature sensor Tp per predetermined time and calculates amount of change $\Delta 1$ in temperature acquired from negative-electrode temperature sensor Tm per predetermined time (S32). Controller 14 calculates amount of change $\Delta 2$ in temperature acquired from relay temperature sensor T2 per predetermined time (S33).

Controller 14 subtracts amount of change $\Delta 2$ for relay temperature sensor T2 from amount of change $\Delta 1$ for positive-electrode temperature sensor Tp to get a difference value and compares the difference value with a set value (S34). If the difference value is greater than the set value (Y in S34), the controller determines the occurrence of a contact failure in a connection of the live part of the positive-electrode connector (S35). If the difference value is less than or equal to the set value (N in S34), the controller determines that a contact is satisfactory.

Similarly, controller 14 subtracts amount of change $\Delta 2$ for relay temperature sensor T2 from amount of change $\Delta 1$ for negative-electrode temperature sensor Tm to get a difference value and compares the difference value with a set value (S34). If the difference value is greater than the set value (Y in S34), the controller determines the occurrence of a contact failure in the negative-electrode connector (S35). If the difference value is less than or equal to the set value (N in S34), the controller determines that a contact is satisfactory.

In the description given above, the temperature at "a live part through which the same electric current as that flowing through the connector terminal flows" described above is a temperature near relay RY1, for example. In this regard, the temperature at "a live part through which the same electric current as that flowing through the connector terminal flows" may be a temperature at a bus bar connected to the connector terminal. Alternatively, the temperature at the live part may be a surface temperature of a portion of a wire harness that is at a predetermined distance (e.g. 1 m) or larger from the connector terminal to which the wire harness is connected.

The temperature at "a contact of a connector terminal" described above may be a surface temperature of fuse F1. The temperature at fuse F1 substantially varies with time. Fuse F1 and the contact of the connector terminal are comparable in the rate of increase of the temperature in response to an increase in contact resistance. The temperature at "a contact of a connector terminal" described above may be a surface temperature of a portion of a wire harness that is very near the connector terminal to which the wire harness is connected.

The second exemplary embodiment described above produces substantially the same effect as the first exemplary embodiment. In addition, the method in the second exemplary embodiment uses temperatures at two locations through which the same electric current flows and thus can unify electric current conditions for the two locations.

The present invention has been described based on the exemplary embodiments. The above exemplary embodiments are intended to be illustrative only, and the person of ordinary skill in the art will understand that various modified examples are possible for the combination of configuration elements and processing processes in the exemplary embodiments and that such modifications are also within the scope of the present invention.

In the exemplary embodiments described above, a contact failure in a connection of a connector between power storage module 10 and management device 20 is detected, for example. A connection of a connector may be disposed at any location other than that between power storage module 10 and management device 20, with proviso that the connection of the connector is used to connect two circuit devices between which a large current flows. For example, this method is applicable to a connection of a connector that connects a load (e.g. a motor and lighting equipment) with a drive circuit.

In the exemplary embodiments described above, controller 24 is disposed in management device 20, for example. However, controller 24 may be disposed in power storage module 10. The controller may be disposed outside power storage module 10 and management device 20.

In the second exemplary embodiment described above, a first temperature sensor and a second temperature sensor detect temperatures inside power storage module 10, and controller 14 acquires detected temperatures from the sensors, for example. However, a first temperature sensor and a second temperature sensor may be disposed in management device 20 to detect temperatures inside management device 20, and controller 24 may acquire detected temperatures from the sensors.

The exemplary embodiments may be specified by items described below.

[Item 1]

A contact failure detection system including:

each temperature sensor (Tp, Tm) to detect a temperature at a contact between a live part of connector (11) for first circuit device (10) and a live part of connector (21) for second circuit device (20); and controller (24) to determine occurrence of a contact failure between the live parts if a difference between an amount of change in temperature detected by temperature sensor (Tp, Tm) per predetermined time and an amount of change in ambient temperature per predetermined time is greater than a set value.

This configuration enables determination of presence or absence of a contact failure with high accuracy.

[Item 2]

A contact failure detection system including:

each first temperature sensor (Tp, Tm) to detect a temperature at a contact between a live part of connector (11) for first circuit device (10) and a live part of connector (21) for second circuit device (20);

second temperature sensor (T2) to detect a temperature at another live part (RY1) in a current path through which an electric current associated with an electric current flowing into the contact flows; and controller (14) to determine occurrence of a contact failure between the live parts of connectors (11, 21) if a difference between an amount of change in temperature detected by first temperature sensor (Tp, Tm) per predetermined time and an amount of change in temperature detected by second temperature sensor (T2) per predetermined time is greater than a set value.

This configuration enables determination of presence or absence of a contact failure with high accuracy.

[Item 3]

The contact failure detection system according to item 1 or 2, wherein while an electric current is flowing between first circuit device (10) and second circuit device (20), controller (14, 24) executes a process to determine whether or not a contact failure has occurred between the live parts of connectors (11, 12).

This configuration contributes to a reduction in the consumption of electric power required for detection of contact failure.

[Item 4]

The contact failure detection system according to item 1 or 3, wherein first circuit device (10) includes power storage unit (10), and wherein second circuit device (20) includes bidirectional inverter (23) and controller (24).

This configuration enables determination of presence or absence of a contact failure in a controlled connector part between power storage unit (10) and bidirectional inverter (23) with high accuracy.

[Item 5]

A contact failure detection system including:

each first temperature sensor (Tp, Tm) to detect a temperature at a first contact between a live part of connector (11) for first power storage unit (10a) and a live part of connector (11) for second power storage unit (10b) connected in series with first power storage unit (10a);

each second temperature sensor (Tp, Tm) to detect a temperature at a second contact between a live part of connector (11) for third power storage unit (10c) connected in series with first and second power storage units (10a) and (10b) and a live part of connector (11) for fourth power storage unit (10d) connected in series with first, second, and third power storage units (10a), (10b), and (10c); and controller (24) to determine whether or not a contact failure has occurred in any one of the first contact and the second contact by comparing an amount of change in temperature detected by first temperature sensor (Tp, Tm) per predetermined time with an amount of change in temperature detected by second temperature sensor (Tp, Tm) per predetermined time.

This configuration enables determination of presence or absence of a contact failure in any one of the first contact and the second contact with high accuracy.

The invention claimed is:

1. A contact failure detection system comprising:
   a temperature sensor to detect a temperature at a contact between a live part of a connector for a first circuit device and a live part of a connector for a second circuit device; and
   a controller to determine an occurrence of a contact failure between the live parts on a condition that a difference between an amount of change in the temperature detected by the temperature sensor per a predetermined time and an amount of change in an ambient temperature of the second circuit device per the predetermined time is greater than a set value.

2. The contact failure detection system according to claim 1,
   wherein the first circuit device includes a power storage unit, and
   wherein the second circuit device includes a bidirectional inverter and the controller.

3. The contact failure detection system according to claim 1, wherein the ambient temperature is measured at a location inside of the second circuit device at a position where the temperature change is smaller than a temperature change of the connector of the second circuit device.

4. The contact failure detection system according to claim 1, wherein the ambient temperature is measured outside of the housing of the second circuit device.

5. The contact failure detection system according to claim 1, wherein while an electric current is flowing between the first circuit device and the second circuit device, the controller executes a process to determine whether or not a contact failure has occurred between the live parts of the connectors.

6. The contact failure detection system according to claim 5, wherein the first circuit device includes a power storage unit, and wherein the second circuit device includes a bidirectional inverter and the controller.

7. A contact failure detection system comprising:
   a first temperature sensor to detect a temperature at a contact between a first live part of a connector for a first circuit device and a second live part of a connector for a second circuit device;
   a second temperature sensor to detect a temperature at a third live part in a current path through which an electric current associated with an electric current flowing into the contact flows; and
   a controller to determine an occurrence of a contact failure between the live parts of the connectors on a condition that a difference between an amount of change in the temperature detected by the first temperature sensor per a predetermined time and an amount of change in the temperature detected by the second temperature sensor per the predetermined time is greater than a set value.

8. The contact failure detection system according to claim 7, wherein while an electric current is flowing between the first circuit device and the second circuit device, the controller executes a process to determine whether or not a contact failure has occurred between the live parts of the connectors.

9. A contact failure detection system comprising:
   a first temperature sensor to detect a temperature at a first contact between a live part of a connector for a first power storage unit and a live part of a connector for a second power storage unit connected in series with the first power storage unit;
   a second temperature sensor to detect a temperature at a second contact between a live part of a connector for a third power storage unit connected in series with the first and the second power storage units and a live part of a connector for a fourth power storage unit connected in series with the first, the second, and the third power storage units; and
   a controller to determine whether or not a contact failure has occurred in any one of the first contact and the second contact by comparing an amount of change in the temperature detected by the first temperature sensor per a predetermined time with an amount of change in the temperature detected by the second temperature sensor per the predetermined time.

* * * * *